(12) United States Patent
Menge et al.

(10) Patent No.: US 7,884,316 B1
(45) Date of Patent: Feb. 8, 2011

(54) SCINTILLATOR DEVICE

(75) Inventors: Peter R. Menge, Chagrin Falls, OH (US); Csaba Rozsa, Parma, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 12/058,409

(22) Filed: Mar. 28, 2008

Related U.S. Application Data

(63) Continuation-in-part of application No. 11/689,404, filed on Mar. 21, 2007, now abandoned.

(51) Int. Cl.
  *G01V 5/04* (2006.01)
(52) U.S. Cl. .................................... 250/261
(58) Field of Classification Search ............. 250/253, 250/256, 261, 370.01, 370.11
See application file for complete search history.

(56) References Cited

U.S. PATENT DOCUMENTS

| | | | |
|---|---|---|---|
| 4,158,773 A | 6/1979 | Novak | |
| 4,360,733 A | 11/1982 | Novak et al. | |
| 4,383,175 A | 5/1983 | Toepke | |
| 4,694,170 A | 9/1987 | Slodzian et al. | |
| 4,764,677 A | 8/1988 | Spurney | |
| 4,994,673 A * | 2/1991 | Perna et al. | 250/483.1 |
| 5,087,818 A * | 2/1992 | Bellian et al. | 250/361 R |
| 5,283,439 A | 2/1994 | Bouissou et al. | |
| 5,406,078 A | 4/1995 | Jacobson | |
| 5,753,918 A | 5/1998 | Pandelisev | |
| 5,869,836 A * | 2/1999 | Linden et al. | 250/361 R |
| 6,222,192 B1 | 4/2001 | Sekela et al. | |
| 6,297,507 B1 | 10/2001 | Chen et al. | |
| 6,359,282 B1 | 3/2002 | Sekela | |
| 6,373,066 B1 | 4/2002 | Penn | |
| 6,433,340 B1 | 8/2002 | Penn | |
| 6,624,420 B1 | 9/2003 | Chai et al. | |
| 6,657,201 B2 | 12/2003 | DeJule | |
| 6,781,134 B1 | 8/2004 | Murray et al. | |
| 6,844,419 B2 * | 1/2005 | Raghavan et al. | 528/501 |
| 7,034,305 B2 | 4/2006 | Frederick et al. | |
| 7,151,261 B2 | 12/2006 | Chai | |
| 2005/0045821 A1 | 3/2005 | Noji et al. | |
| 2005/0184241 A1 | 8/2005 | Clarke et al. | |
| 2005/0253072 A1 | 11/2005 | Chai | |
| 2006/0027742 A1 | 2/2006 | Srivastava et al. | |

(Continued)

OTHER PUBLICATIONS

Rozsa, C.M., et al., "Characteristics of Scintillators For Well Logging to 225C," Bicron Corporation, Newbury, OH 44065, 1989, 12 pgs.

(Continued)

*Primary Examiner*—David P Porta
*Assistant Examiner*—David S Baker
(74) *Attorney, Agent, or Firm*—Larson Newman & Abel, LLP

(57) ABSTRACT

A scintillator device is provided that includes a scintillator device having a scintillator crystal and a shock absorbing member surrounding the scintillator crystal. The scintillator device has a detected light output, $((LO_{100})/(LO_0)) \times 100\%$, of not less than 88% wherein $LO_{100}$ is the detected light output of the device after 100 hours of exposure at 175° C. and $LO_0$ is the original detected light output at room temperature prior to exposure at 175° C.

18 Claims, 3 Drawing Sheets

U.S. PATENT DOCUMENTS

| | | |
|---|---|---|
| 2006/0102834 A1 | 5/2006 | Mickael |
| 2007/0007460 A1 | 1/2007 | Hochstetler et al. |
| 2007/0036887 A1 | 2/2007 | Haase et al. |
| 2007/0209581 A1 | 9/2007 | Ferrand et al. |
| 2008/0261012 A1 | 10/2008 | Kopf et al. |
| 2009/0101816 A1 | 4/2009 | Noji et al. |
| 2009/0102733 A1 | 4/2009 | Kanne et al. |

OTHER PUBLICATIONS

Rozsa, C., et al., "Stability of Bircon's Standard Logging Detectors," 3 pgs.

U.S. Appl. No. 12/106,011, filed Apr. 18, 2008, Inventors: Peter R. Menge et al.

U.S. Appl. No. 12/104,794, filed Apr. 17, 2008, Inventors: Peter R. Menge.

zircarzirconia.com, "Alumina Fibers and Textiles, Type AL," Product Data, Bulletin #E-01, Jan. 2004, pp. 1-3.

\* cited by examiner

SCINTILLATOR DEVICE

CROSS-REFERENCE TO RELATED APPLICATION(S)

The following disclosure is a continuation-in-part application which claims priority to U.S. application Ser. No. 11/689,404 filed Mar. 21, 2007, entitled "Scintillator Device" and having named inventors Peter R. Menge and Csaba Rozsa, which application is incorporated by reference herein in its entirety.

BACKGROUND

1. Field of the Disclosure

The present disclosure is directed to scintillators, particularly ruggedized scintillator devices for industrial applications.

2. Description of the Related Art

Scintillation detectors have been employed in various industrial applications, such as the oil and gas industry for well logging. Typically, these detectors have scintillator crystals made of an activated sodium iodide material that is effective for detecting gamma rays. Generally, the scintillator crystals are enclosed in tubes or casings, which include a window permitting radiation induced scintillation light to pass out of the crystal package for measurement by a light-sensing device such as a photomultiplier tube. The photomultiplier tube converts the light photons emitted from the crystal into electrical pulses that are shaped and digitized by associated electronics that may be registered as counts and transmitted to analyzing equipment. In terms of well logging applications, the ability to detect gamma rays makes it possible to analyze rock strata as gamma rays are emitted from naturally occurring radioisotopes, typically of shales that surround hydrocarbon reservoirs. Today, a common practice is to make measurements while drilling (MWD). For MWD applications, the detector should be ruggedized, that is, it should have a high shock resistance and be capable of withstanding high temperatures, while maintaining performance specifications for a reasonable lifetime.

A problem associated with MWD applications is that the detector will report a higher than an actual count rate if the scintillation device detects false counts via vibration induced counts. Therefore, falsely high readings may occur due to the fact that the detector output will be composed of radiation-induced counts and vibration-induced counts. Moreover, the problem is exaggerated when detecting low-level radiation events while the detector is subject to a severe operational environment, such as drilling.

Accordingly, the industry continues to need improvements in scintillator devices, particularly ruggedized scintillator devices that can withstand the harsh environments of industrial applications, such as high shock and high temperature applications common in drilling. In addition, it is desirable to provide ruggedized scintillator devices that maintain detecting performance over an extended lifetime.

SUMMARY

According to one aspect, a scintillator device is provided that includes a scintillator crystal and a shock absorbing member surrounding the scintillator crystal and having a Shore A hardness of at least 25. The scintillator device has a detected light output, $((LO_{100})/(LO_0)) \times 100\%$, of not less than 88%, wherein $LO_{100}$ is the detected light output of the device after 100 hours of exposure at 175° C. and $LO_0$ is the original detected light output at room temperature prior to exposure at 175° C.

According to another aspect, a radiation detector device is provided that includes a photomultiplier tube and a scintillator housing coupled to the photomultiplier tube. The scintillator housing includes a scintillator crystal, a shock absorbing member substantially surrounding the scintillator crystal and having a Shore A hardness of at least 25, and a casing substantially surrounding the shock absorbing member, such that the casing has a window in one end. According to this aspect the device has a detected light output, $((LO_{100})/(LO_0)) \times 100\%$, of not less than 88%, wherein $LO_{100}$ is the detected light output of the device after 100 hours of exposure to 175° C., and $LO_0$ is the original detected light output, at room temperature, prior to exposure at 175° C.

According to a third aspect, a scintillator device is provided that includes a scintillator crystal and a shock absorbing member surrounding the scintillator crystal, wherein the shock absorbing member has a total mass loss of less than 0.50% at a temperature of 125° C. over 24 hours. The scintillator device has a detected light output, $((LO_{100})/(LO_0)) \times 100\%$, of not less than 88%, wherein $LO_{100}$ is the detected light output of the device after 100 hours of exposure at 175° C. and $LO_0$ is the original detected light output at room temperature prior to exposure at 175° C.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

According to a one aspect, a radiation detector is disclosed that includes a photomultiplier tube, and a scintillator housing coupled to the photomultiplier tube. The scintillator housing includes a scintillator crystal, a shock absorbing member substantially surrounding the scintillator crystal, and a casing substantially surrounding the shock absorbing member, such that the casing has a window in one end. According to this aspect the device has a detected light output, $((LO_{100})/(LO_0)) \times 100\%$, of not less than 88%, wherein $LO_{100}$ is the detected light output of the device after 100 hours of exposure to 175° C., and $LO_0$ is the original detected light output, at room temperature, prior to exposure at 175° C.

Figure 1:
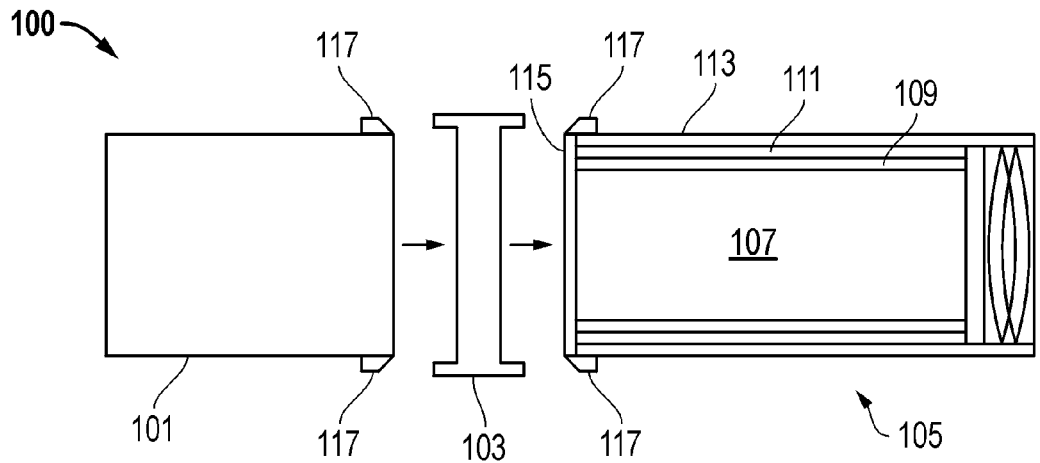
FIG. 1 is an illustration of a radiation detector according to one embodiment.

Referring to the figures, FIG. 1 illustrates a radiation detector 100 according to one embodiment. As illustrated the radiation detector includes a photosensor 101, light pipe 103, and a scintillator housing 105. As mentioned above, the scintillator housing 105 can include a scintillator crystal 107 disposed within and substantially surrounded by a reflector 109 and a shock absorbing member 111. The scintillator crystal 107, reflector 109, and the shock absorbing member 111 are housed within a casing 113 which includes a window 115 at one end of the casing 113.

In further reference to FIG. 1, the photosensor 101 can be a device capable of spectral detection and resolution, such as a photomultiplier tube or other detection device. The photons emitted by the scintillator crystal 107 are transmitted through the window 115 of the scintillator housing 105, through the light pipe 103, to the photosensor 101. As is understood in the art, the photosensor 101 provides a count of the photons detected, which provides data on the radiation detected by the scintillator crystal. The photosensor 101 can be housed within a tube or housing made of a material capable of withstanding and protecting the electronics of the photosensor 101, such as a metal, metal alloy or the like. Various materials can be provided with the photosensor 101, such as within the detection device housing, to stabilize the detection device during use and ensure good optical coupling between the light pipe 103 and the scintillator housing 105.

As illustrated, the light pipe 103 is disposed between the photosensor 101 and the scintillator housing 105. The light pipe 103 can facilitate optical coupling between the photosensor 101 and the scintillator housing 105. According to one embodiment, the light pipe 103 can be coupled to the scintillator housing 105 and the photosensor 101 using biasing members 117 that provide a spring resiliency. Such biasing members 117 can facilitate absorption of shocks to the detector 100 which can reduce false readings and counts during use of the device. As will be appreciated, the biasing members can be used in conjunction with other known coupling methods such as the use of an optical gel or bonding agent.

Figure 2:
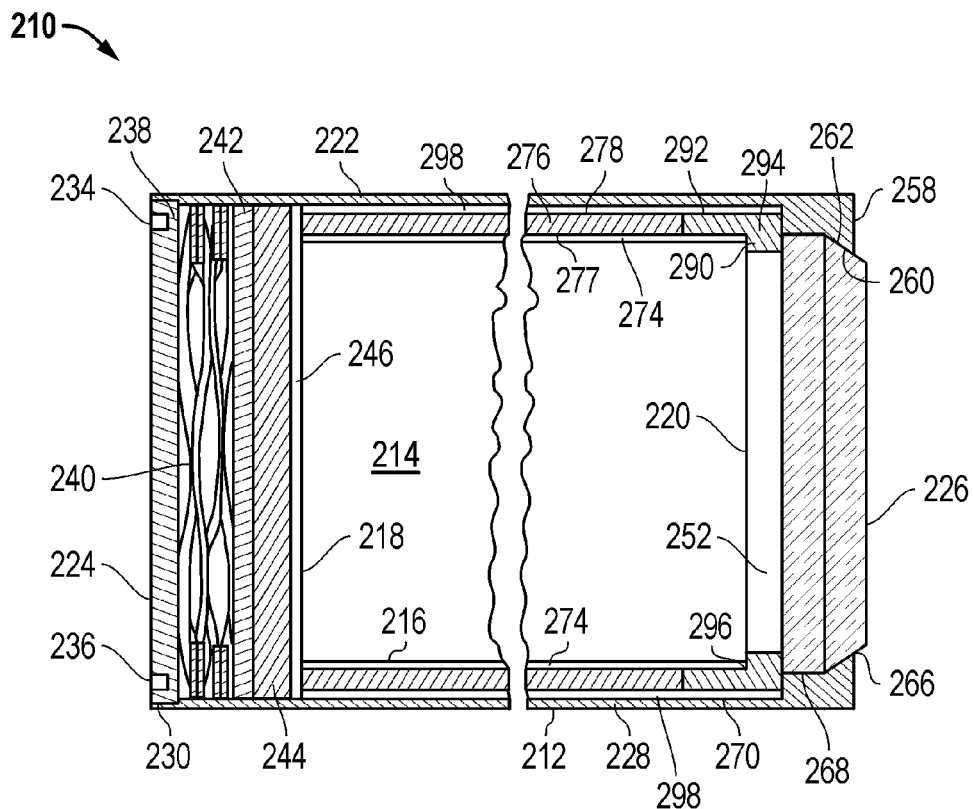
FIG. 2 is a cross sectional illustration of a scintillator device according to one embodiment.

In further reference to the scintillator device, FIG. 2 provides an illustration of a scintillator device 210 according to one embodiment. The scintillator device 210 includes a scintillator crystal 214 disposed within a housing 212. According to one embodiment, the scintillator crystal 214 can be an activated iodide crystal, such as a thallium-activated sodium iodide crystal. The scintillator crystal 214 can have various shapes, such as a rectangular shape, or a cylindrical surface 216 as illustrated including flat end faces 218 and 220. It will be appreciated that the surface finish of the scintillator crystal 214 can be sanded, polished, ground, etc., as desired.

In further reference to FIG. 2, the housing 212 can include a casing 222 that can be cylindrical or tubular to effectively fit the selected geometry of the scintillator crystal 214. The casing 222 can be closed at its rear end by a back cap 224 and at its front end by an optical window 226. The optical window 226 can include a material that is transmissive to scintillation light given off by the scintillator crystal 214. According to one embodiment, the optical window 226 is made of crown glass. The casing 222 and back cap 224 can be made of a non-transmissive material, such as a metal, metal alloy, or the like. As such, in one embodiment, the casing 222 and the back cap are made of stainless steel or aluminum. The back cap 224 can be coupled to the casing 222 using a sealant, mechanical fasteners, or by a vacuum type peripheral weld. According to a particular embodiment, the casing 222 can have a recess in the casing wall to form a welding flange 230, which facilitates fitting the back cap 224. Additionally, the back cap 224 can include an opening to its outer side such that annular grooves 234 and 236 are spaced slightly inwardly from the circumferential edge. Welding is performed at the outer ends of the welding flange 230 and the reduced thickness of a connecting portion 238 of welding flange 230 reduces welding heat, conducting heat away from the welding flanges to permit formation of a desired weld.

The scintillator device 210 further includes a biasing member 240, a backing plate 242, a cushion pad 244, and an end reflector 246. The biasing member 240, can include a spring, as illustrated, or other suitable resilient biasing members. The biasing member 240 functions to axially load the crystal 214 and bias it towards the optical window 226. According to one embodiment, the biasing member 240 can be a stack of wave springs disposed crest-to-crest as shown. Other suitable biasing members can include but are not limited to, coil springs, resilient pads, pneumatic devices or even devices incorporating a semi-compressible liquid or gel. As such, suitable materials for the biasing member 240 can include a metal, a metal alloy, polymers, or the like.

The backing plate 242 disperses the force of the biasing member 240 across the area of the cushion pad 244 for substantially uniform application of pressure and axial loading of the rear face 218 of the scintillator crystal 214. Alternatively, the backing plate and biasing member may be integrated into a single structure, such as in the case of an elastomeric polymer member, which may have a rigid reinforcement layer. The cushion pad 244 can typically be made of a resilient material such as a polymer, particularly an elastomer, such as, a silicone rubber. The thickness of the cushion pad 244 can vary within a range of 0.06 to 0.30 inches for most crystals ranging in diameter from 0.25 to 3.0 inches and crystals ranging in length from 0.5 to 15 inches.

Additionally, the cushion pad 244 can be adjacent to the end reflector 246. The end reflector 246 can include a suitable reflecting material such as a powder, like aluminum oxide (alumina) powder, or a reflective tape or foil such as, a white porous unsintered PTFE material. A porous reflective material facilitates the escape of air or gas from between the reflector film and crystal face and can avoid pockets of trapped air or gas which could prevent the end reflector 246 from being pushed by the cushion pad 244 flat against the rear end face 218 of the scintillator crystal 214 which can have a negative impact on reflectivity at the reflector-crystal interface. The reflector material may be 0.010 inches thick. According to particular embodiment, the reflecting material is a film that can be wrapped at least once around the crystal and possibly two or more times as desired. Alternatively, the end reflector 246 can be a metal foil disk, which conforms to the surface of the crystal end face 218 and provides suitable reflectance toward the optical window 226.

In accordance with a particular embodiment, the end reflector 246 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the end reflector 246 is made essentially of a fluorinated polymer. In another more particular embodiment, the end reflector 246 is made essentially of polytetrafluoroethylene (PTFE).

As indicated above, the biasing member 240 exerts a force on the scintillator crystal 214, to urge the scintillator crystal 214 towards the optical window 226 thereby maintaining suitable optical coupling between the scintillation crystal 214 and the optical window 226. An optional layer 252 (or interface pad) can be provided between the scintillator crystal 214 and the optical window 226 to facilitate effective optical coupling. According to one embodiment, layer 252 can include a transparent polymer material, such as a transparent silicone elastomer. The thickness of the interface pad 252 can be within a range of 0.06 to 0.30 inches for crystals ranging in diameter from 0.25 to 3.0 inches and in length from 0.5 to 15 inches.

In further reference to FIG. 2, as illustrated, the optical window 226 can be retained in the casing 222 by an annular lip 258 at the front end of the casing 222. The annular lip 258 can protrude radially inwardly from the casing wall 228 and can define an opening having a diameter less than the diameter of the optical window 226. Additionally, the annular lip 258 can have an inner beveled surface 260 and the optical window 226 can include a corresponding beveled, circumferential edge surface 262 that engages the inner beveled surface 260. The mating beveled surfaces can be hermetically sealed by a high temperature solder such as 95/5 or 90/10 lead/tin solder. The solder also aids in restraining the optical window 226 against axial push-out, in addition to providing a high temperature seal. The optical window 226 can be axially trapped between the annular lip 258 and the scintillator crystal 214 such that it can be radially constrained by the casing wall 222. Optionally, to permit wetting of the optical window 226 by the solder, the sealing edge surfaces of the optical window 226 can include a metalized coating such as platinum.

According to the illustrated embodiment of FIG. 2, the inner beveled surface 260 can forwardly terminate at a cylindrical surface 266 and rearwardly at a cylindrical surface 268. The cylindrical surface 268 closely surrounds a portion of the optical window 226 and extends axially inwardly to a cylindrical surface 270, which extends axially to the flange 230 at the opposite end of the casing 222. The interface of the optical window 226 is aligned with the annular shoulder formed between the cylindrical surfaces 268 and 270.

According to another embodiment, the scintillator crystal 214 can be substantially surrounded by a reflector 274. The reflector 274 can incorporate materials as described above in accordance with the end reflector 246, such as a porous material including a powder, foil, metal coating, or polymer coating. According to one embodiment, the reflector 274 is a layer of aluminum oxide (alumina) powder. In another embodiment, the reflector 274 is a self-adhering white porous PTFE material. As noted above, air or gas that might otherwise be trapped between the end reflector 246 and the scintillator crystal 214 can escape through the porous reflector 274.

In one embodiment, the reflector 274 can be substantially surrounded by a liner (not illustrated) disposed between the outer surface of the reflector 274 and the inner surface 277 of a shock absorbing member 276. Such a liner can include a metal material, particularly a thin metal liner such as a foil. In accordance with a particular embodiment, the coating material can include aluminum foil.

In accordance with a particular embodiment, the reflector 274 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the reflector 274 is made essentially of a fluorinated polymer. In another more particular embodiment, the reflector 274 is made essentially of polytetrafluoroethylene (PTFE).

In addition to the reflector 274 surrounding the scintillator crystal 214, a shock absorbing member 276, can substantially surround the scintillator crystal 214. The shock absorbing member 276 can surround and exert a radial force on the reflector 274 and the scintillator crystal 214. As shown, the shock absorbing member 276 can be cylindrical to accompany the selected shape of the scintillator crystal 214. The shock absorbing member 276 can be made of a resiliently compressible material and according to one embodiment, is a polymer, such as an elastomer. Additionally, the surface contour of the shock absorbing member 276 can vary along the length to provide a frictionally engaging surface thereby enhancing the stabilization of the scintillator crystal 214 within the casing 222. For example, the shock absorbing member 276 can have a uniform inner surface 277 and an outer surface 278, or optionally, can have ribs extending axially or circumferentially on the inner surface 277, the outer surface 278, or both. Still, the shock absorbing member 276 can have protrusions, dimples, or other shaped irregularities on the inner surface 277, the outer surface 278, or both surfaces to frictionally engage the scintillator crystal 214 and the casing 222. The shock absorbing member is discussed in more detail below.

As also illustrated, the scintillator device 210 can include a ring 290 that extends from the front end of the shock absorbing member 276 to the optical window 226. The ring 290 facilitates stabilization and alignment of the circular interface pad 252 during assembly of the scintillator device 210. The ring 290 has an axially inner end portion 292 substantially surrounding the scintillator crystal 214 and an axially outer end portion 294 substantially surrounding the interface pad 252. The intersection of the interior surfaces of the axially inner end portion 292 and the axially outer end portion 294 can include a shoulder 296, which facilitates positioning of the ring 290 on the scintillator crystal 214 during assembly.

In certain embodiments, the ring 290 can be made of resilient material, including an organic material, such as an elastomer. In one particular embodiment, the ring 290 is in direct contact with the inner surface of the casing 222 and the outer surface of the scintillator crystal 214, but may not necessarily provide a hermetically sealing interface between the scintillator crystal 214 and the shock absorbing member 276, such as relying on an interference fit between the crystal 214 and the and the shock absorbing member 276.

Moreover, the ring 290 can include additional materials, generally located within the inner surface and abutting the scintillator crystal 214 to enhance the reflection of the ring 290. Such materials can include, for example, alumina or PTFE (Teflon™). The ring 290 and the shock absorbing member may alternatively be integrated together as a continuous integral component.

In further reference to the components of the scintillator device 210 as illustrated in FIG. 2, a sleeve 298 extends longitudinally from the optical window 226 to approximately the back cap 224. The sleeve 298 can substantially surround the shock absorbing member 276 and scintillator crystal 214 and in a compressed state (when fitted within the casing 222) provides a radially compressive force to the shock absorbing member 276 and scintillator crystal 214. According to one embodiment, insertion of the sleeve 298 into the casing 222 requires compression of the sleeve thereby providing a radially compressive force on the crystal 214. Suitable materials for the sleeve 298 include resilient materials, such as a metal, metal alloy, a polymer, carbon or the like. Additionally, the sleeve 298 can include a material that has a lower coefficient of friction with the material of the casing 222 than does the material of the shock absorbing member 276 with the material of the casing 222.

Figure 3:
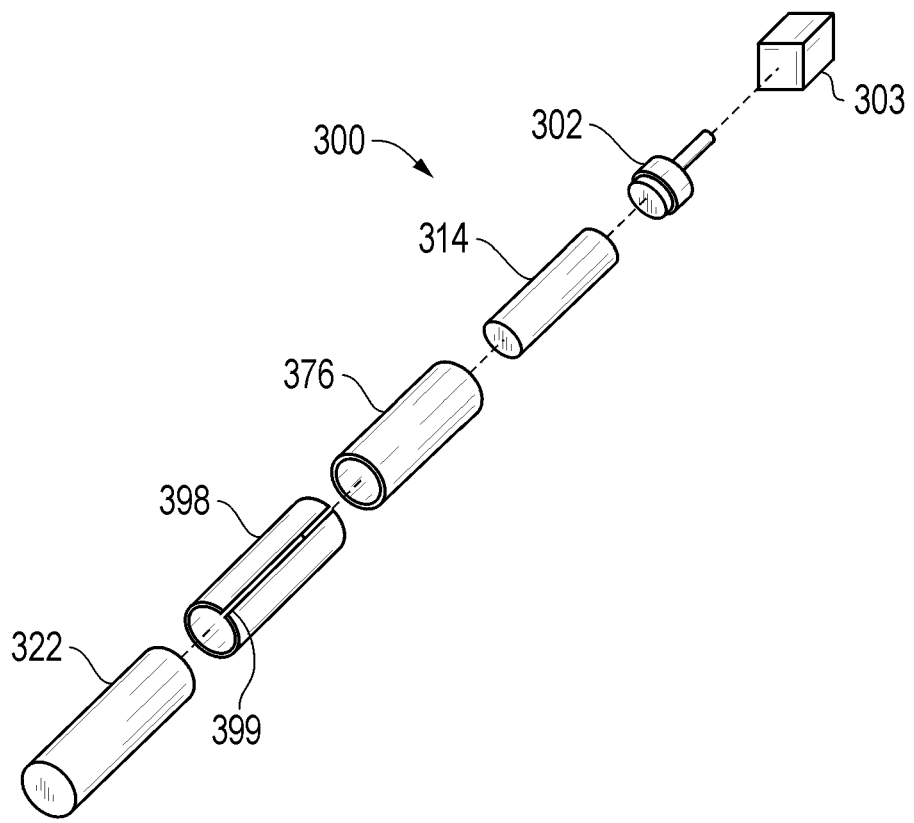
FIG. 3 is an exploded view of a scintillator device according to one embodiment.

In further reference to the sleeve 298 and its incorporation into the scintillator device 210, FIG. 3 provides an exploded view of the arrangement 300 of the component layers of the scintillator device according to one embodiment. As illustrated in FIG. 3, the sleeve 398 can be slotted along its longitudinal length, thereby providing a longitudinally extending gap 399. The width of the longitudinally extending gap 399 when the shock absorbing member 376 is disposed within the sleeve 398 without any externally applied compression can vary, and can generally be wide. However, when a radially compressive force is applied and the sleeve 398 and shock absorbing member 376 are inserted into the casing 322 the width of the longitudinally extending gap 399, can be zero or near zero. The sleeve 398 can be compressible in other suitable ways, for example, the sleeve 398 may be fluted or crimped to allow for radial compression of the sleeve 398 along its axial length.

In further reference to the sleeve 398, the thickness of the sleeve 398 along the longitudinal direction can be selected thereby providing for controlled radial loading along the length of the scintillator crystal 314. To increase or decrease the amount of radial loading the thickness of the sleeve 398 can be increased or decreased accordingly, wherein a thicker sleeve increases the radial loading on the scintillator crystal 314 and a thinner sleeve decreases the radial loading on the scintillator crystal 314.

FIG. 3 further provides a particular assembly of the scintillator device 300 according to one embodiment. After applying a reflector to the scintillator crystal 314, the subassembly of the reflector and scintillator crystal 314 can be inserted into the shock absorbing member 376 and this subassembly can be inserted in the sleeve 398 to form a scintillator crystal 314-shock absorbing member 376-sleeve 398 subassembly. Before insertion of this subassembly into the casing 322, the sleeve 398 can be in an uncompressed state, and the diameter of the sleeve 398 can be greater than the inside diameter of the metal casing 322. A radial compressive force can be applied to the scintillator crystal 314-shock absorbing member 376-sleeve 398 subassembly during insertion into the casing 322. To facilitate insertion, a forcing mechanism 302 can be used. The forcing mechanism 302, can apply an axial force to the scintillator crystal 314-shock absorbing member 376-sleeve 398 subassembly, and can include devices such as a hydraulic ram or push rod 302 coupled to a conventional control apparatus 303.

Figure 4:
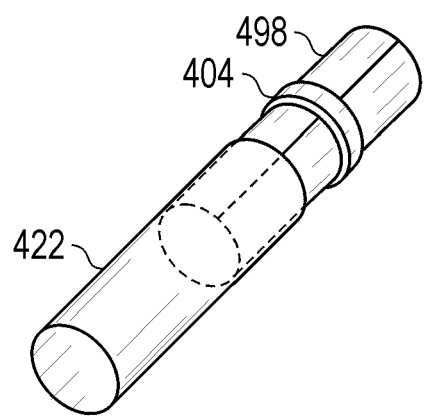
FIG. 4 is a perspective diagram of a scintillator device according to one embodiment.

Referring to FIG. 4, the incremental compression of the scintillator crystal 314-shock absorbing member 376-sleeve 398 subassembly (illustrated in FIG. 3 and denoted as 498 in FIG. 4) during insertion into the casing 422 can be facilitated by use of a clamp 404. The clamp 404 can include various devices capable of exerting a radially compressive force, such as a radial clamp or compression ring. The clamp 404 can be adjusted to change positions along the longitudinal length of the scintillator crystal 314-shock absorbing member 376-sleeve 398 subassembly 498 during insertion of the subassembly into the casing 422. It will be appreciated that the size of the clamp 404 will depend upon the size of the subassembly 498 and the rigidity of the sleeve 398 and the desired compressive force suitable for effective insertion of the subassembly 498 into the casing 422. Additionally, the axial rigidity of the sleeve 398 can impact the location at which the radial clamp 404 is applied to the sleeve 398. Accordingly, the subassembly 498 may be progressively inserted at increments ranging from 0.25 inches to 1.0 inch, or more.

In further reference to the coupling of the components of the subassembly 498 within the casing 422, the sleeve 398/casing 422 interface has a reduced coefficient of friction relative to the coefficient of friction of a typical casing 422/shock absorbing member 376 interface which would exist without the sleeve 398. As such, the reduced coefficient of friction facilitated by incorporation of a sleeve 398 to form a sleeve 398/casing 422 interface facilitates assembly of the device and reduces the potential for damage to the components of the scintillator crystal 314-shock absorbing member 376-sleeve 398 subassembly. Moreover, provision of the sleeve 398/casing 422 interface provides a suitable radial loading for stabilization of the device during operation.

Provision of a scintillator device in accordance with the embodiments described herein is suitable for reducing vibration induced counts associated with the harsh environmental conditions of industrial applications, particularly in drilling applications. Suitable biasing and stabilization (both axial and radial stabilization) of the scintillator device in combination with select materials of component parts reduces vibration induced counts, and enhances the accuracy and precision of the scintillator device. The enhanced radial stabilization and stiffness causes vibration induced counts to occur at higher excitation frequencies, such as at frequencies above a threshold frequency, i.e., above the operational dynamic bandwidth of the detector. Accordingly, fewer vibrations to the scintillator device are capable of causing the necessary frequency to cause a vibration induced count and therefore vibration induced counts are reduced.

According to one aspect, a scintillator device is provided that includes a scintillator crystal and a shock absorbing member surrounding the scintillator crystal. The scintillator device has a detected light output, $((LO_{100})/(LO_0)) \times 100\%$, of not less than 88%, wherein $LO_{100}$ is the detected light output of the device after 100 hours of exposure at 175° C. and $LO_0$ is the original detected light output at room temperature prior to exposure at 175° C. For clarity, the general designation "$LO_t$" is used herein to define the detected light output of the scintillator device after a time of operation "t". It will be appreciated that the detected light output for a time of operation "t" of the device is generally described herein in relative terms, as a ratio or percentage of the original detected light output of the device at time zero, or $LO_0$. Unless otherwise specified herein, light output values are measured at room temperature, and are generated from application of 662 keV gamma rays issuing from a cesium isotope, Cs-137. $LO_0$ is measured at room temperature prior to exposure at elevated temperatures and $LO_t$ where t>0 is measured after cooling the device from an elevated temperature to room temperature.

Notably, the scintillator device includes a shock absorbing member, such as shock absorbing member 276 (See FIG. 2), which generally provides a resilient housing for the scintillator crystal and substantially surrounds the crystal during use in industrial applications. The shock absorbing member is generally formed of a resilient material, such as a polymer or composite compound. According to a particular embodiment, the shock absorbing member is made of a silicone material.

According to one embodiment, the shock absorbing member is a bakeless material. For the purposes of this disclosure, a bakeless material is a material that can undergo an initial heat treatment, such as curing, but does not require additional heat treatment beyond a curing process to evolve species that may volatilize. In this context, other shock absorbing members, such as those including carbon fibers, are subject to a baking process (after an initial heat treatment) to evaporate species that could potentially degrade the scintillator device. See, for example U.S. Pat. No. 6,433,340. Accordingly, suitable materials of the present shock absorbing member do not require a baking process and include materials that are suitable as-formed, without additional heat treatments. Utilization of bakeless materials expedites manufacturing of the device which reduces likelihood of damage to the scintillator crystal and other components.

According to one embodiment, the tensile strength of the material of the shock absorbing member is generally not less than 2.5 MPa, not less than 3.0 MPa, not less than 4.0 MPa, or not less than 5.0 MPa. According to a particular embodiment, the strength can be even greater, depending upon the desired application, such that the tensile strength of the material of the shock absorbing member is not less than 6.0 MPa. According to one particular embodiment, the tensile strength of the material of the shock absorbing member is within a range between 2.5 MPa and 12 MPa, or more particularly within a range between 3.0 MPa and 10 MPa. Material of such tensile strength in combination with above discussed components can provide a suitable shock absorbing housing for the scintillator crystal useful in industrial applications.

In further reference to the shock absorbing member, according to one embodiment, the working temperature of the shock absorbing member is not less than 175° C. As used herein, the term "working temperature" of the shock absorbing member material is the upper temperature at which the material is suggested for use by the manufacturer before the material properties are significantly altered, that is, for example, the temperature at which the material undergoes substantial volatilization. As such, according to a particular embodiment, the working temperature of the shock absorbing member is not less than 185° C., such as not less than 195° C., or even not less than 200° C. Such working temperatures facilitate the use of the shock absorbing member in conjunction with previously discussed components in industrial applications having harsh environmental conditions.

Unlike conventional designs, the shock absorbing member of the present disclosure may be stiffer, thus having a greater hardness. In one embodiment, the shock absorbing member can have a measured Shore A hardness of at least 25. In other embodiments, the shock absorbing member can be stiffer, such that it has a Shore A hardness of at least 30, at least 35, at least 40, or even at least 45. Still, according to one embodiment, the Shore A hardness of the shock absorbing member is within a range between 30 and 70, and more particularly within a range between 40 and 60.

In accordance with the foregoing, stability of the shock absorbing member at elevated temperatures is desirable. According to embodiments herein, the material has less than 1.0% total mass loss (TML) and less than 0.1% collected volatile condensable material (CVCM) according to ASTM E595 (subject to a temperature of 125° C., in a pressure of less than $7\times10^{-3}$ Pa for twenty four hours). According to a particular embodiment, the material of the shock absorbing member has a total mass loss of not greater than 0.50% when subject to the ASTM E595 standardized test. Still, the total mass loss of the material can be less, such as not greater than 0.40%, or even not greater than 0.30%. Additionally, suitable materials for the shock absorbing member can have a low level of total mass loss and when subject to temperatures above and beyond those required by ASTM E595. Accordingly, the material of the shock absorbing member can have a total mass loss of not greater than 1.0% when subject to a temperature of not less than 150° C., or 175° C., or even in some cases 200° C., under a pressure of less than $7\times10^{-3}$ Pa for twenty four hours. Use of silicone, such as LSR (liquid silicone rubber), in combination with the particularly low volatility characteristics represents a particularly desirable combination.

It will be appreciated that the material of the shock absorbing member can also be incorporated into other components within the scintillator device. Accordingly, such a material can also be incorporated into other padding components such as the interface pad, cushion pad, or alternatively light transmitting components, such as the light pipe (illustrated in FIG. 1).

In one embodiment, the scintillator device can include an interface pad disposed adjacent the scintillator crystal, typically at one end of the scintillator crystal. In one particular embodiment, the interface pad can include a material having less than 1.0% total mass loss (TML) and less than 0.1% collected volatile condensable material (CVCM) according to ASTM E595 (subject to a temperature of 125° C., in a pressure of less than $7\times10^{-3}$ Pa for twenty four hours). According to a particular embodiment, the material of the interface pad has a total mass loss of not greater than 0.50% when subject to the ASTM E595 standardized test. Still, the total mass loss of the material can be less, such as not greater than 0.40%, or even not greater than 0.30%. Additionally, suitable materials for the interface pad can have a low level of total mass loss and when subject to temperatures above and beyond those required by ASTM E595. Accordingly, the material of the interface pad can have a total mass loss of not greater than 1.0% when subject to a temperature of not less than 150° C., or 175° C., or even in some cases 200° C., under a pressure of less than $7\times10^{-3}$ Pa for twenty four hours. Use of silicone, such as LSR (liquid silicone rubber), in combination with the particularly low volatility characteristics represents a particularly desirable combination.

In another embodiment, the material of the cushion pad can include a material having a filler. The filler typically includes a colloidal ceramic powder, such as alumina or silica, which in some situations facilitates the formation of a thixotropic material for working purposes. Additionally, in one embodiment, the cushion pad has a Shore A hardness of at least 25. In certain other embodiments, the cushion pad has a greater Shore A hardness, such as a hardness of at least 30, or at least 40, or at least 50. In one particular embodiment, the hardness of the cushion pad is within a range of between 30 and 70, such as within a range of between 40 and 60. Generally, such a material can also be a bakeless material, in accordance with such a bakeless material described above.

In further reference to particular components of the scintillator device, a cushion pad can be included within the housing, typically at one end of the scintillator crystal, such as between the scintillator crystal and a biasing member. In one embodiment, the cushion pad can include a material having less than 1.0% total mass loss (TML) and less than 0.1% collected volatile condensable material (CVCM) according to ASTM E595 (subject to a temperature of 125° C., in a pressure of less than $7\times10^{-3}$ Pa for twenty four hours). According to a particular embodiment, the material of the cushion pad has a total mass loss of not greater than 0.50% when subject to the ASTM E595 standardized test. Still, the total mass loss of the material can be less, such as not greater than 0.40%, or even not greater than 0.30%. Additionally, suitable materials for the cushion pad can have a low level of total mass loss and when subject to temperatures above and beyond those required by ASTM E595. Accordingly, the material of the cushion pad can have a total mass loss of not greater than 1.0% when subject to a temperature of not less than 150° C., or 175° C., or even in some cases 200° C., under a pressure of less than $7\times10^{-3}$ Pa for twenty four hours. Use of silicone, such as LSR (liquid silicone rubber), in combination with the particularly low volatility characteristics represents a particularly desirable combination.

In another embodiment, the material of the cushion pad can include a material having a filler. The filler typically includes a colloidal ceramic powder, such as alumina or silica, which in some situations facilitates the formation of a thixotropic material for working purposes. Additionally, in one embodiment, the cushion pad has a Shore A hardness within a range of between 40 and 70, such as within a range of between 40 and 60. Generally, such as material can also be a bakeless material, in accordance with such a bakeless material described above.

According to other embodiments, components for transmitting light, such as the light pipe (see FIG. 1) can include a material similar to the material of the shock absorbing member. Notably, the material can have superior mechanical properties as well as suitable light transmission properties. Suitable materials for the light pipe can include materials having an index of refraction of not less than 1.40, such as within a range of between 1.40 and 1.45.

Figure 5:
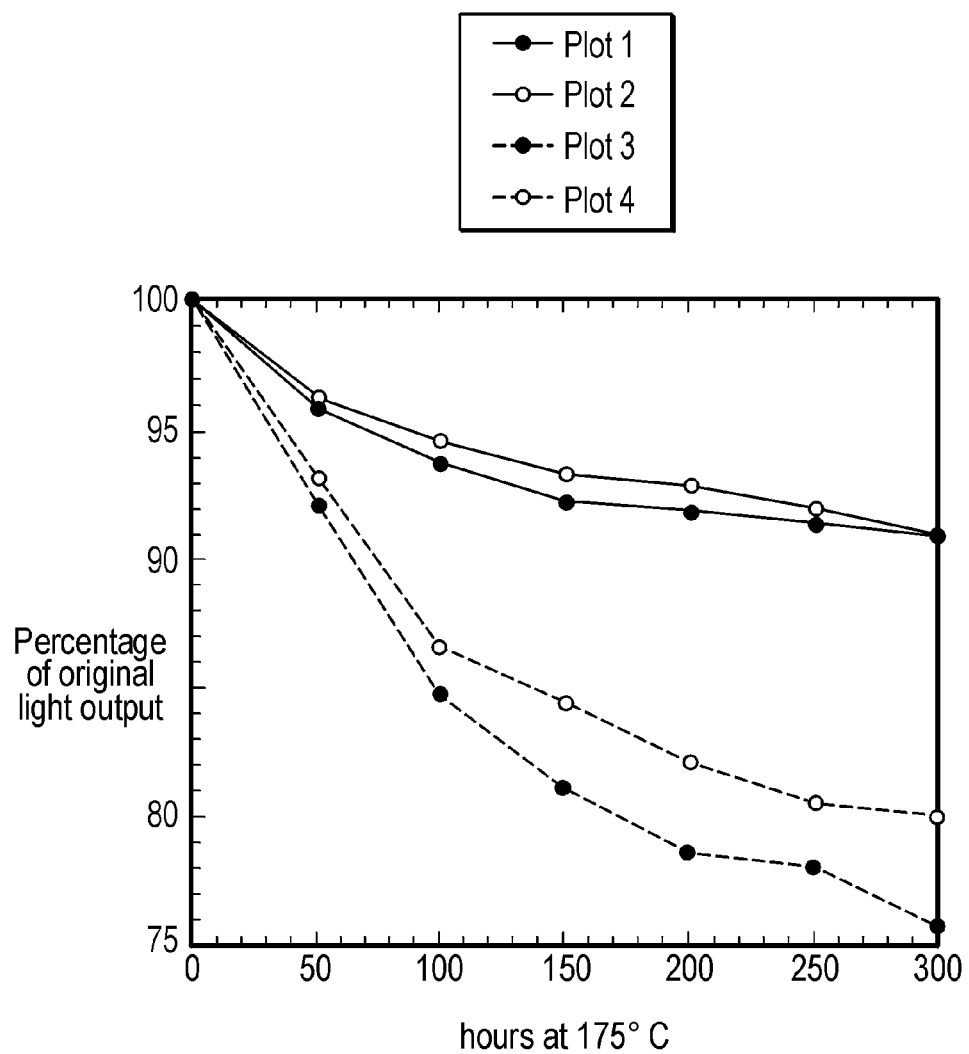
FIG. 5 is a plot illustrating the percentage of original light output as a function hours of operation at 175° C. for four scintillator devices, two of which, are in accordance with embodiments herein.

Referring to FIG. 5, a plot is illustrated presenting the percentage of the original light output of four different scintillator devices as a function of hours of operation at 175° C. The plots of FIG. 5 provide a comparison of the percentage of detected light output between two embodiments of the present invention that incorporate a shock absorbing member as described above (plots 1 and 2) and two comparative scintillator devices that incorporate conventional shock absorbing members (plots 3 and 4).

According to one embodiment, the scintillator device exhibits a detected light output $((LO_{150})/(LO_0))\times 100\%)$ of not less than 88%, such as not less than 90%, or even not less than 92% of the original detected light output after 150 hours of operation at 175° C. The particular embodiments characterized in FIG. 5 (plots 1 and 2) were measured to have light outputs of 93% and 94% respectively.

Indeed even after 200 hours of operation at 175° C., certain embodiments exhibit a percentage of detected light output of not less than 88%, such as not less than 90%, or even 92%. Still further, the scintillator device may have a detected light output (i.e., $((LO_{250})/(LO_0))\times 100\%$) of not less than 88% of the original detected light output after 250 hours of operation at 175° C. and maintains such light output even at 300 hours of operation at 175° C.

Scintillator devices in accordance with embodiments herein generally have improved light output performance under demanding conditions, such as high temperatures that may be encountered in the field, even over extended time periods, while also being ruggedized to provide improved operation for various industrial applications. While not wishing to be tied to any particular theory, the provision of stabilized subassemblies in combination with particular materials of the scintillator device, such as the shock absorbing member, provide improved mechanical, chemical and temperature resistance for demanding industrial applications.

Example

An exemplary scintillator device having components as described in embodiments above is assembled and tested as provided below. The scintillator device has a cylindrical crystal of thallium activated sodium iodide having a diameter of roughly 1.59 inches and a length of 3.07 inches. The device also further includes a reflector made of a thin sheet of polytetrafluoroethylene (PTFE), having an average thickness of 0.02 inches and wrapped around the crystal. The device also includes a shock absorbing member wrapped around the reflector. The shock absorbing member includes a silicone material, such as Dow Corning 93-500 Thixotropic Space Grade Encapsulant. The scintillator device further includes a thin sleeve formed around the shock absorbing member. The sleeve is made of a stainless steel and has an average thickness of 0.02 inches. The sleeve and other components are encased in a cylindrical housing, which is also be made of stainless steel and has an average thickness of 0.03 inches. The cylindrical housing can include a window at one end. Within the housing, the crystal is compressed against a clear silicone interface pad which contacts the window. The crystal is compressed against the silicone interface pad via a biasing member at the end of the housing opposite the window. Upon assembly, the scintillator device is 4.065 inches in length and 1.845 inches in diameter.

Testing of the device included coupling of the device to a photomultiplier tube and multi-channel analyzer to measure the light output of the device before and after heat treatment. All measurements were conducted at room temperature and made use of 662 keV gamma rays issuing from a cesium isotope, Cs-137. Initial measurements of the device demonstrated a relative sensitivity of the scintillator device to be at an average of 728 channels. The scintillator device was then subjected to heat treatment, which includes a temperature of 175° C. for a duration of 100 hours. After heat treatment, the device was cooled and measurements were conducted, as before, at room temperature using 662 keV gamma rays issuing from the cesium isotope, Cs-137. The scintillator device demonstrated a relative sensitivity, post heat treatment, to be at an average of 720 channels. The scintillator device retained 98.9% of its original light output after the heat treatment.

While ruggedized scintillator apparatuses are known in the art, see for example those disclosed in "Characteristics of Scintillators for Well Logging to 225C" by C. M. Rozsa, et al., Prepared for the IEEE Nuclear Science Symposium, San Francisco, October 1989, such scintillator apparatuses have limitations. Such ruggedized scintillators utilize a comparatively soft curable potting material that is hermetically isolated from the scintillator crystal, and have a complex construction.

Next generation ruggedized scintillator devices were formed that replaced the potting material with a preformed silicone rubber sleeve for the shock absorbing material. Additionally, the change from the potting material to the preformed sleeve, permitted simplification of the structure and fabrication techniques, notably deletion of isolation structures otherwise necessary to prevent wetting the crystal due to the moist potting material.

While the second generation ruggedized designs (i.e., those including the preformed sleeve) provided easier assembly, it was discovered that the devices were prone to decreased efficiency and reduced lifetime when used in harsh environments such as in high-temperature MWD applications. The decrease in efficiency was not well understood, but based on the knowledge in the art at the time (See for example, U.S. Pat. No. 6,844,419) it was theorized that the silicone-containing interface pad that was in direct contact with the crystal was volatilizing harmful species that deposited on the front face of the crystal thus degrading the performance of the device. The logic behind the theory was sound: the interface pad was in direct contact and disposed between the crystal and the optical window, and in the direct optical pathway of the device. Accordingly, the silicone-containing interference pad between the crystal and the optical window was removed, or in some instances replaced with a low volatility material.

Unexpectedly, such ruggedized scintillator devices still demonstrated poor performance. After further empirical studies, it was discovered that during exposure to high temperatures for extended durations, the ruggedized scintillator devices had discoloration inside the housing and the outer radial surface of the crystal, while such discoloration was absent on the reflector material, despite the fact that the reflector material was positioned between the scintillator crystal and the shock absorbing member. Despite the presence of the reflector acting as a barrier, the present inventors replaced the silicone sleeve with a low volatility silicone sleeve in an attempt to isolate the root cause of the contamination issue, and it was surprisingly found that scintillator performance improved notably without additional modification. See, FIG. 5.

While not wishing to be tied to a particular theory, performance enhancements as described herein demonstrate that the use certain reflector materials, particularly those including a fluorinated polymer species, do not suitably isolate the crystal and are not suitable as a deposition surface for harmful species that may volatilize from components within the housing. Therefore, while sleeve replacement was thought to be unnecessary because the shock absorbing material was hermetically isolated from the crystal via a reflector material, use of a low volatility material for the shock absorbing member surprisingly resulted in improved scintillator device performance when using a reflector material incorporating a fluorinated polymer material. It was found that the volatilized species, rather than re-depositing on the reflector/barrier, penetrated the reflector/barrier and preferentially deposited on the crystal. The source of the volatilized species (from the sleeve rather than the interface pad) and the preferential deposition on the crystal was discovered only after the above-described iterative process: (i) replacing the interface pad with low volatility material in an attempt to address performance degradation, (ii) further study of performance, (iii) replacement of the silicone sleeve in an attempt to isolate (rule out) the sleeve, and (iv) the surprising discovery of notable performance enhancement.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A scintillator device comprising:
a scintillator crystal;
a reflector comprising a fluorinated polymer material substantially surrounding a portion of the scintillator crystal; and
a shock absorbing member having a Shore A hardness of at least 25 substantially surrounding the reflector, the scintillator device having a detected light output, $((LO_{150})/(LO_0))\times100\%$, of not less than 88% wherein $LO_{150}$ is the detected light output of the device after 100 hours of exposure at 175° C. and $LO_0$ is the original detected light output at room temperature prior to exposure at 175° C.

2. The scintillator device of claim 1, wherein $((LO_{200})/(LO_0))\times100\%$ is not less than 88%, wherein $LO_{200}$ is the detected light output of the device at room temperature after 150 hours of exposure at 175° C.

3. The scintillator device of claim 2, wherein $((LO_{200})/(LO_0))\times100\%$ is not less than 90% wherein $LO_{200}$ is the detected light output of the device at room temperature after 200 hours of exposure at 175° C.

4. The scintillator device of claim 1, wherein the shock absorbing member comprises silicone having a total mass loss (TML) of less than 1.0% according to ASTM E595.

5. The scintillator device of claim 1, wherein the shock absorbing member has a total mass loss of less than 0.50% at a temperature of 125° C. over 24 hours.

6. The scintillator device of claim 1, wherein the shock absorbing member has a Shore A hardness within a range of between 30 and 70.

7. The scintillator device of claim 1, wherein the reflector comprises a fluorinated polymer having a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and combinations thereof.

8. The scintillator device of claim 7, wherein the reflector is made essentially of polytetrafluoroethylene.

9. The scintillator device of claim 1, wherein the scintillator device further comprises a sleeve substantially surrounding the shock absorbing member.

10. The scintillator device of claim 9, wherein the sleeve comprises carbon.

11. The scintillator device of claim 1, wherein the scintillator crystal comprises an activated material selected from the group of crystalline materials consisting of iodides, bromides, and chlorides.

12. The scintillator device of claim 11, wherein the scintillator crystal material comprises one of, thallium activated sodium iodide, cerium activated lanthanum bromide, cerium activated lanthanum chloride, and sodium activated cesium iodide.

13. The scintillator device of claim 1, further comprising an interface pad adjacent to the scintillator crystal.

14. The scintillator device of claim 13, wherein the interface pad comprises silicone having a total mass loss (TML) of less than 1.0% according to ASTM E595.

15. The scintillator device of claim 1, further comprising a cushion pad adjacent to the scintillator crystal.

16. The scintillator device of claim 15, wherein the cushion pad comprises silicone having a total mass loss (TML) of less than 1.0% according to ASTM E595.

17. The scintillator device of claim 1, further comprising a liner substantially surrounding the reflector and disposed between the reflector and the shock absorbing member.

18. A radiation detector device comprising:
a photomultiplier tube; and
a scintillator housing coupled to the photomultiplier tube, the scintillator housing comprising:
a scintillator crystal;
a reflector comprising a fluorinated polymer material substantially surrounding at least a portion of the scintillator crystal;
a shock absorbing member having a Shore A hardness of at least 25 substantially surrounding at least a portion of the reflector; and
a casing substantially surrounding the shock absorbing member, the casing having a window in one end, wherein the device has a detected light output, $((LO_{150})/(LO_0))\times100\%$, of not less than substantially 88%, wherein $LO_{150}$ is the detected light output of the device after substantially 100 hours of exposure to 175° C., and $LO_0$ is the original detected light output at room temperature prior to exposure at 175° C.

* * * * *

UNITED STATES PATENT AND TRADEMARK OFFICE
CERTIFICATE OF CORRECTION

PATENT NO. : 7,884,316 B1  Page 1 of 1
APPLICATION NO. : 12/058409
DATED : February 8, 2011
INVENTOR(S) : Peter R. Menge et al.

It is certified that error appears in the above-identified patent and that said Letters Patent is hereby corrected as shown below:

In the Claims

Claim 1, Column 13, line 54, please delete "88%" and insert --90%--
Claim 1, Column 13, line 55, please delete "100" and insert --150--
Claim 2, Column 13, line 61, please delete "150" and insert --200--
Claim 18, Column 14, line 61, please delete "88%" and insert --95%--
Claim 18, Column 14, line 62, please delete "100" and insert --150--

Signed and Sealed this
Fourteenth Day of October, 2014

Michelle K. Lee
*Deputy Director of the United States Patent and Trademark Office*